Nov. 25, 1941.  C. O. FAIRCHILD  2,264,256
DAMPED PHOTOELECTRIC INDICATING CONTROLLER
Filed June 25, 1940
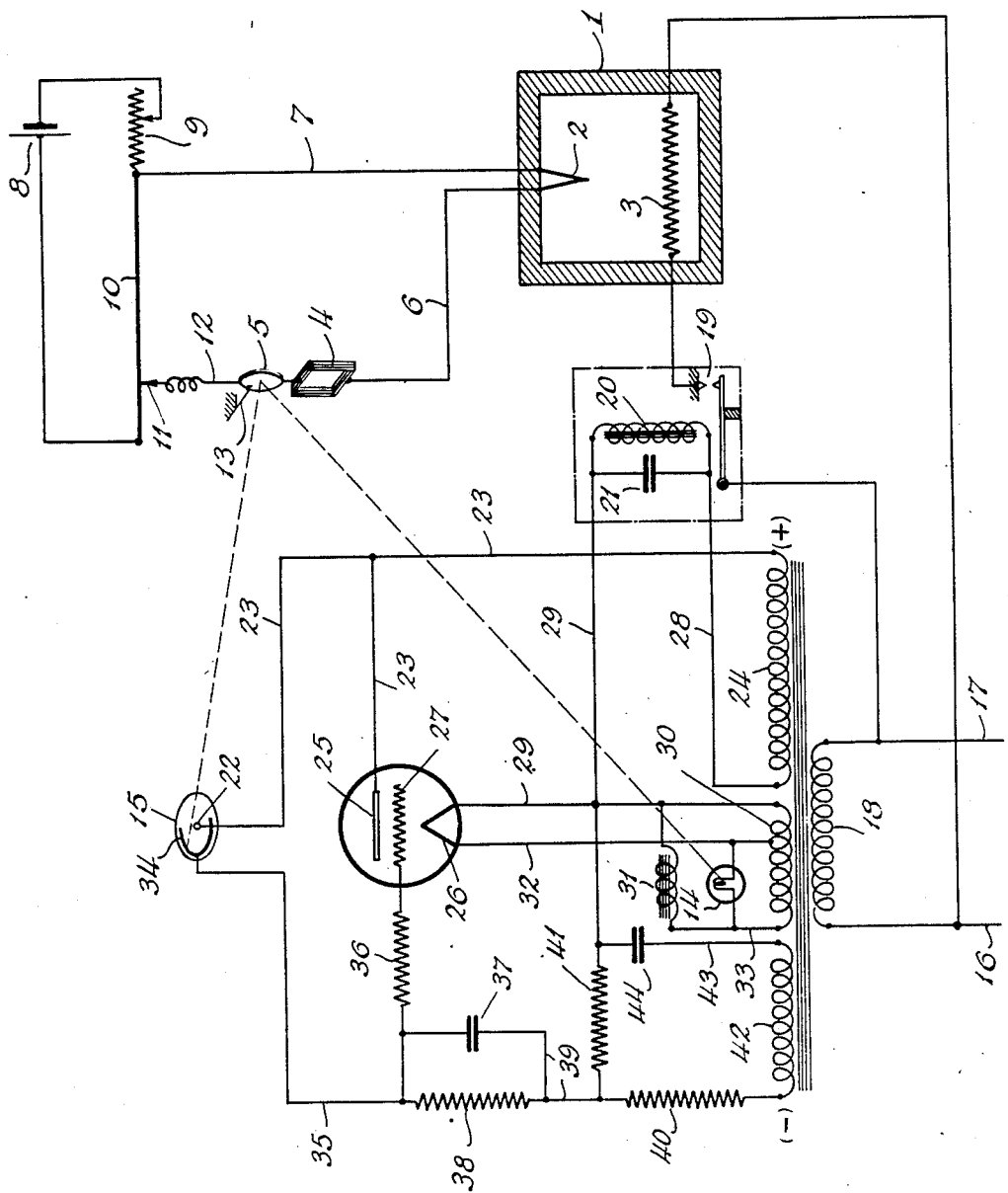
INVENTOR.
CHARLES O. FAIRCHILD
BY
E. S. Smith
AGENT Patented Nov. 25, 1941

2,264,256

UNITED STATES PATENT OFFICE 2,264,256

DAMPED PHOTOELECTRIC INDICATING CONTROLLER

Charles O. Fairchild, St. Albans, N. Y., assignor to Charles J. Tagliabue Mfg. Co., Brooklyn, N. Y., a corporation of New York Application June 25, 1940, Serial No. 342,257

8 Claims. (Cl. 250—41.5)

The present invention relates generally to instruments for and methods of controlling variable magnitudes, and more particularly to instruments of this type which, as disclosed in my copending applications Serial No. 56,880, filed December 31, 1935, and Serial No. 125,135, filed February 10, 1937 (which issued July 9, 1940, and June 25, 1940, respectively, as Patents 2,207,343 and 2,205,777), convert variations in the magnitude to be controlled into deflections of a beam of radiant energy whose presence or direction is detected by a photo-sensitive element.

It particularly relates to an improvement of the photo-responsive circuit of the regulator of Patent 2,205,777 which enables such regulator to respond to changes of the sensed deflections without undesirable repeated oscillations of a relay which is actuated by an amplified current governed by the photo-sensitive element. Such circuit improvement is useful in installations where mechanical vibration exists or fluctuations of the light on the photo-sensitive element occur at a higher frequency than it is practicable to operate the final controlling means for the regulated magnitude.

It is a general object of the present invention to provide a simple, inexpensive and compact instrument of the stated class, having damping means, and which nevertheless attains the optimum amplitude of the relay-actuating current in response to changes of the average value of a signal without setting up repeated oscillations of the relay and hence of the final controlling element due to rapid oscillations of the signal such as may result from mechanical vibration. A related and important object is to provide such an improved instrument which will function with the usual A. C. supply having e. g., a frequency of either 25 or 60 cycles per second.

A further related object is the provision of such damping means in a circuit which includes a phototube and an amplifier having a triode. An incidental related object is to so locate the damping means that such means is of minimum size and cost. Still a further object in connection with A. C. use is the provision of inexpensive means for obtaining optimum amplification and associated with the damping means, such associated means functioning by bringing the phase of the grid potential to substantially 180° from that of the triode's plate or anode and by suppressing the excessive grid current which would otherwise occur upon each alternation.

In connection with a regulating system including a galvanometer sensitive to the difference between a measured electrical variable and a balancing electrical quantity, an amplifier sensitive to the deflection of the galvanometer, and a relay actuated by the current output of the amplifier, a particular object of the invention is to provide means for preventing repeated oscillations of the relay such as may be due to either mechanical vibration or a sudden change of the value of the measured variable, which means achieves this end by making the shortest possible period of oscillation of the relay system which is caused by the deflection of the galvanometer considerably exceeding the period of the galvanometer.

While the present invention has been disclosed in connection with a regulating system, it may be used also in connection with a measuring system such as, e. g., is disclosed in Patent 1,970,559 of which I am the patentee and in copending applications S. N. 131,843 and 137,588, respectively, filed March 19, 1937, and April 17, 1937, all of which are assigned to Charles J. Tagliabue Mfg. Co., the asignee of the present application. Of course, the present invention may find many applications in various related arts and its details may be modified to suit innumerable operating requirements. This is particularly true of the improved amplifier circuit. I do not wish to be limited either to the specific embodiment herein disclosed or to its specific application. Instead, I intend to claim whatever I have disclosed herein and is patentable. Other objects and advantages of the invention will appear as the description thereof proceeds and the features of novelty will be set forth in the appended claims.

The drawing is a generally conventional diagram of the system with the phototube and the movable element of the galvanometer and its associated stop shown in rough perspective. The path of the beam of light for the phototube is shown by a dash line. The drawing illustrates the invention shown by way of example in connection with a regulator for the temperature of an electrically heated furnace.

Insulated furnace 1 contains thermocouple 2 and heating resistor 3. The movable element or coil 4 of the galvanometer carries mirror 5 and one side of it is electrically connected with one side of the thermocouple by lead 6, the other side being connected by lead 7 with a potentiometric circuit (shown diagrammatically) which includes battery 8, resistor 9, and slide-wire 10 connected in series to provide a drop of potential along the slide-wire of the same order as the potential set up by the thermocouple. Movable contact 11 is shown manually adjustable along the slide-wire 10 to set the desired temperature of regulation, although when the invention is applied to an indicating or recording instrument this would, of course, be re-positioned automatically in response to changes of the measured variable, temperature in this case. The movable contact is connected by flexible lead 12 with the other side of the movable element of the galvanometer. Light from lamp 14 illuminates mirror 5 which is provided with stop 13 which is located to keep its reflected beam from passing off of phototube 15 in one direction of deflection of the galvanometer, phototube 15 being preferably of the vacuum type.

An A. C. supply is connected by supply lines 16 and 17 with the transformer primary 18. The heating resistor 3 is connected with the supply lines by relay switch 19 which is shown opened by gravity in the absence of a strong enough current in relay coil 20 to close this switch, capacitor 21 being shunted across the ends of this coil for A. C. operation.

In describing the circuit connecting the phototube 15, the amplifier tube and the relay coil 20, the anode 22 of the phototube is considered to be connected by lead 23 to the positive end of the three secondary sections shown; in other words the time of the A. C. cycle is selected to be that which gives generally the same operation as a D. C. source would. Later herein will be described the action of such circuit with the phase 180° different, when the potential of lead 23 and of phototube anode 22 is negative.

Lead 23 connects one end of one secondary section 24 with phototube anode 22 and with the plate or anode 25 of a triode which contains filament or cathode 26 and grid 27. The other end of section 24 is connected by lead 28 with one end of relay coil 20 whose other end is connected by lead 29 with one end of filament 26 and with one end of the intermediate secondary section 30 which also supplies current to lamp 14 and to electromagnet 31 which acts to vibrate the galvanometer enough to prevent sticking of the latter's mirror 5 against its stop 13. Lead 32 connects the other end of filament 26 and one end of that of lamp 14 with an intermediate point on section 30. Lead 33 connects the other end of section 30 with the other end of the filament of lamp 14. Electromagnet 31 is connected between leads 29 and 33.

Cathode 34 of the phototube is connected by lead 35 and resistor 36 with grid 27 of the triode. Capacitor 37 and its shunting resistor 38 connect lead 35 with lead 39 which is connected with one end of resistors 40 and 41. The other end of resistor 40 is connected with the "negative" end of secondary section 42 whose other end is connected by lead 43 with condenser 44. Lead 29 is also connected with condenser 44 and the other end of resistor 41.

While it is believed that one skilled in the art would be able to make a workable device from the foregoing description, still it may be helpful to give the following relations by way of example. The resistances of 36 and 38 may be respectively taken as 10Ω (i. e. 10 megohms) and 100Ω while the capacity of 37 may be taken as 0.03 mf. or higher.

Before describing the operation of the system as a whole, it may be well to include the following notes on the functions of several elements or subcombinations:

(a) Phototube 15 acts both as a source of weak signals (of the order of one micro-ampere) and as a "check-valve" to prevent reverse flow. When such a phototube is dark, its resistance may be taken as infinite for practical purposes. When the potential of its anode 22 is negative, current cannot flow through the phototube even though its cathode 34 be illuminated; however when the potential of its anode 22 is positive and the cathode 34 is illuminated, current flows and the resistance of such a phototube varies substantially inversely with the total amount of light reaching its cathode. The result of changes of the illumination of the phototube is hence to vary the potential of its cathode 34 and of lead 35 which is connected to such cathode. Under the present invention, another uni-directional and weak source of variable potential could be substituted for phototube 15 without requiring substantial modification of my improved amplifier system. Since the phototube current is of the order of a micro-ampere and the grid current of the triode is of the order of milli-amperes when the grid is positive, it will be seen that a source of stronger variable signals could be used with due consideration for the well-known triode characteristics as regards the relative potentials of grid, filament and plate in the order of increasing positiveness simply by having lead 35 be of such high resistance as to keep the rate of charging the capacitor 37 down to the value which will give the desired infrequency of relay operation. Resistor 38 functions as a leak across the capacitor 37 which acts to slowly equalize the potential across such capacitor.

(b) Resistor 36 suppresses the rise of grid current upon a positive swing of grid voltage and hence keeps the grid current from charging capacitor 37 too strongly during such swing. The charge on the capacitor 37 is increased during the half swing shown, by the very weak current from phototube 15 while the phototube is illuminated and the charge is decreased by the "reverse grid current" during the other half swing. Consequently resistor 36 must be large enough to reduce the reverse grid current so that it will be relatively smaller than the photoelectric current.

(c) Capacitor 44 and its associated resistors 40 and 41 assist in obtaining an efficient phase relation between the grid voltage and the voltage of the triode's anode. As earlier noted, the phase of the grid potential is preferably 180° from that of the triode's anode. Thus, in the present example, the maximum period of the galvanometer 4 is less than 1.5 seconds, the minimum period of relay operation due to the swinging of the galvanometer is more than 3.0 seconds, and the period of the usual A. C. supply is 1/60 second.

It may be noted that the systems of the above mentioned applications S. N. 131,843 and 137,588 are for systems including elements corresponding with the phototube, relay triode, condenser 37 and resistors 38, 40 and 41; but that such systems lack resistor 36 and condenser 44, include a higher valued resistor than resistors 40 or 41 in series with capacitor 37, and also differ from the present system as regards the location of the relay coil 20 with respect to the triode's plate 25 and the first mentioned secondary section 24.

The operation of the above described system, with either a D. C. or an A. C. source at a time when the right hand end (in the figure) is positive, is as follows: The desired temperature of regulation is set by manually adjusting movable contact 11 to a potential on the slide-wire 10 equal to that of the thermocouple 2 at such temperature. When the temperature of thermocouple 2 rises above that desired, the beam reflected from galvanometer mirror 5 moves off the phototube cathode 34 and no current flows in lead 35 with the result that the average potential of the grid gradually drops. However, with A. C., before this grid potential has time to drop appreciably the supply has reversed and the potential of lead 35 and the upper (in the drawing) plate of capacitor 37 rises rapidly. As earlier mentioned, resistor 36 acts to suppress an otherwise excessive flow of current through capacitor 37 to grid 27 when the left hand end of the transformer secondary is positive, i. e. when the operating current is 180° different in phase from that shown on the drawing. The net result is: the grid potential gradually falls to approach a final value at which the triode's plate current is not sufficient to keep relay switch 19 closed and the supply of heat to the furnace is cut off.

With the thermocouple 2 at the set temperature, the reflected beam is partly on the phototube cathode 15 with the result that the phototube resistance is lowered to a value to maintain the potential of the upper plate of condenser 37 at a level which keeps the grid at a level which causes the amplifier's current output to be at or near the value which is sufficient to close relay switch 19 or keep it closed. Means for narrowing the zone of output current for relay operation are described in Patent 2,205,777 and may, of course, be used if desired in connection with the present system.

With a drop in the temperature of the thermocouple 2, the galvanometer turns in a counter-clockwise direction (viewed from above) to bring its mirror-reflected beam onto phototube cathode 34, mirror 5 moving against its stop 13 while such beam is still on such cathode. The drawing is diagrammatic, a long cylindrical cathode 34 being preferably used with its axis in the plane of the deflection of such reflected beam and normal to the direction of such beam as set forth in Patent 2,205,777. With the light beam entirely upon the phototube cathode 34 and with the polarity as shown, the resistance of the phototube is low so that the potential of lead 35 rises with the result that grid 27 becomes more positive and the triode's plate current increases to a value which closes the relay switch 19. Reversals of A. C. as earlier brought out are relatively ineffective as regards the average potential of the upper plate of capacitor 37 and hence of grid 27.

With a rapid swinging of the galvanometer mirror 5 such as is commonly due to mechanical vibration of the foundation for the instrument or occasionally due to sudden changes of the difference of potential across the galvanometer (which is not likely to be the case where a single usual thermocouple 2 is responsive to changes in the temperature of a furnace), the light beam swings on and off the phototube with the result that a series of intermittent current surges reach the upper plate of capacitor 37 during positive swings (as shown) of the potential and while the light beam is fully on the phototube. The net result is a slow following by the amplifier output current of the at-least-roughly average position of the beam and a resultant single operation of the relay switch 19 each time such output current crosses the relay-operating value instead of every time that the light beam crosses the illuminated edge of the phototube. There is a well known dead-zone of relay operation between the current values for closing and opening the relay and such dead-zone contributes to the effectiveness of the damping means of the present invention. The location of capacitor 37 with its associated resistors 36 and 38 in the grid-filament circuit makes it possible to use economical sizes of such elements as compared with any attempt to increase the size of, e. g., capacitor 21 in the triode's output circuit.

The terms and expressions which I have employed are used as terms of description and not of limitation, and I have no intention, in the use of such terms and expressions, of excluding any equivalents of the features shown and described and portions thereof, but recognize that various modifications are possible within the scope of the invention claimed. In particular, the invention is not limited to electrical means but the damping means may have, e. g., hydraulic or pneumatic equivalents in functionally-similar fluid-operated circuits.

I claim:

1. In a device of the class disclosed, the combination of a photoelectric means having a current output which depends upon its illumination, an amplifier for said current output, an electrical relay means connected with said amplifier and actuated by the current output therefrom, and means connecting said photoelectric means with said amplifier to damp the response of the amplified current relative to the changes of illumination and including a resistor-shunted capacitor which has its potential affected by the current from the photoelectric means and a resistor between said capacitor and an output-controlling part of said amplifier, whereby changes of the stated illumination govern the actuation of the relay means but at a lower frequency than that of such changes.

2. In a device of the class disclosed which is suited for operation from an A. C. supply and adapted to be connected both with a source of rapidly variable weak signals and an electrical relay means which is suited for less frequent actuation by a relatively stronger intermittent current due to half-wave rectification, the combination of means for amplifying the weak signals including an amplifier tube having a control grid, a cathode, an anode and their related circuits and having a portion of the grid circuit connected to the signal source, said tube being constructed to produce an output of relatively strong intermittent substantially uni-directional current in accordance with said signals; and a transformer having a primary connectable with the power supply and a secondary connected to the signal source and to the amplifying means to effectively energize the relay means when the signal source furnishes a potential-increasing current to the stated grid connection; the stated connection of the signal source with the secondary including a capacitor and a shunting high-valued resistor between said source and said secondary, and a lower-valued resistor located between said capacitor and said grid which is effective to suppress grid current when said grid is more positive than said anode.

3. In a phototube-controlled device, the combination with a phototube and a circuit connected therewith and having the potential of a point in the circuit vary in accordance with the illumination of the phototube, an amplifier having an output circuit including a control means which is actuated by the output of the amplifier in accordance with the potential of a control grid thereof, and an A. C. supply for said device, of a resistor solely connecting said control grid with the portion of the circuit whose potential varies with the current output of the phototube and hence with the illumination of the phototube, whereby is suppressed an excessive grid current otherwise arising from reversals of the A. C. supply and tending to counteract the effect of phototube.

4. A regulator for a variable physical quantity and connectable with an A. C. power supply through a transformer, comprising, in combination, a measuring system including a means sensitive to the variable for setting up an electrical quantity of corresponding value, a means adjustable to set a predetermined value of regulation of said variable, and a galvanometer sensitive to differences of the actual value of said electrical quantity from the set value of the latter and including a light-modifying means, said galvanometer tending to oscillate in the presence of mechanical vibration; a source of light; controlling means including a final electromagnetically-operated element for controlling the regulated variable; and a circuit means for governing the actuation of said element in accordance with the position of said light-modifying means, said circuit means including a phototube arranged relative to said light-modifying means to be illuminated by light from said source which is modified by such means, a first resistor, an amplifier tube which has a cathode, an anode connected to the phototube anode, and a grid connected by said resistor to the cathode of the phototube, a second resistor for converting photoelectric current values into corresponding grid potential values, a capacitor in shunt with said second resistor, one end of such shunt being connected with a point in the circuit between said phototube cathode and the first resistor and the other end of such shunt being connected to substantially one end of the transformer secondary, the anode of the phototube and that of the amplifier tube being in effect connected to substantially the other end of the secondary, and with the cathode of the amplifier connected to an intermediate portion of said secondary.

5. In an instrument, of the measuring and controlling class disclosed, which is to be governed in accordance with changes in a variable physical quantity and connectable with an A. C. power supply through a transformer, the combination of a measuring system including means sinsitive to the variable for setting up a physical quantity of corresponding value, means for setting up a balancing physical quantity, and a device which tends to oscillate in the presence of mechanical vibration and is sensitive to a difference of said quantities and includes a means for modifying light in accordance with said difference; a source of light; an electromagnetically-operated relay means including a movable element; and a circuit means for governing the actuation of said element in accordance with the condition of said light-modifying means, said circuit means including a photoresponsive means of high impedance arranged relative to said light-modifying means to be illuminated by light from said source modified by such means, an amplifier having a cathode, an anode and a control grid, a first resistor in the path of the photoelectric current for converting photoelectric current values into related potential values of the control grid, and a damping means for the photoelectric current including a capacitor in shunt with said resistor, and a second resistor connecting the amplifier grid with one side of said photoresponsive means and of said capacitor to suppress the grid current which would otherwise flow from the capacitor to the grid during one half cycle of each alternation, one end of the first resistor being connected to substantially one end of the secondary, the anodes of the phototube and of the amplifier tube being in effect connected to substantially the other end of the secondary, and with the cathode of the amplifier connected to an intermediate portion of said secondary.

6. An elecronic amplifying circuit network comprising, in combination, an A. C. source, a triode amplifier connected with said A. C. source, a signal source of weak unidirectional current, a first resistor carrying said weak current to convert changes of said weak current into related changes of a large potential, a capacitor of low impedance in the grid circuit of said amplifier in shunt with said resistor for damping the stated signals, and a second resistor between said capacitor and the grid of said amplifier for substantially suppressing current from said capacitor to said grid during the half cycle in which the grid is positive relative to the cathode of the amplifier, said signal source being connected to the grid and to the capacitor to have said weak current flow from the signal source to the capacitor during the other half cycle in which the grid is negative.

7. In a phototube-controlled device for connection with a transformer on an A. C. supply, the combination of a phototube, a capacitor and a resistor shunting said capacitor, a conductor connecting the phototube cathode with one end of the resistor and one side of the capacitor, a second conductor connecting the other end of the resistor and the other side of the capacitor with substantially one end of the secondary, an amplifier tube having an output anode, a cathode, and a grid whose potential controls said output, a controlling means actuated by said output, and a second resistor solely connecting said control grid with the first named conductor, whereby is suppressed an excessive grid current otherwise arising from reversals of the A. C. supply and tending to counteract the effect of the phototube, substantially the other end of the secondary being connected with the anode of the phototube and that of the amplifier tube, and the cathode of the amplifier tube being connected with an intermediate point of the secondary.

8. In a device of the class disclosed, the combination of a highly sensitive element which deflects from a normal position in response to changes of a physical variable, said element being oscillatable at its natural period about said normal position also upon mechanical vibration, means responsive to the position of said element for setting up weak currents in correspondence with the instantaneous positions of said element; an amplifying system for said currents including a damping means having a larger time-constant than said natural period and a capacitor for allowing the change of a potential so that the value of the potential is in accordance with the average value of said currents during said time-constant, an amplifying means governed by said potential for setting up a much stronger current than said weak current in correspondence with said potential, and a high impedance connection between said capacitor and a governing portion of said amplifying means; and a second element operatively connected with said amplifying system to be actuated by said stronger current, whereby the actuation of said second element is in accordance with the value of the sensed variable and not with the oscillations of said sensitive element due to mechanical vibration of said device.

CHARLES O. FAIRCHILD.

CERTIFICATE OF CORRECTION.

Patent No. 2,264,256.  November 25, 1941.

CHARLES O. FAIRCHILD.

It is hereby certified that error appears in the printed specification of the above numbered patent requiring correction as follows: Page 3, second column, line 58, beginning with "3. In a" strike out all to and including the word and period "phototube." in line 74, comprising claim 3; page 4, second column, line 58, claim 8, for "allowing" read --slowing--; and for the claims now numbered 4, 5, 6, 7 and 8 read 3, 4, 5, 6 and 7 respectively; in the heading to the printed specification, line 8, for "8 Claims" read --7 Claims--; and that the said Letters Patent should be read with this correction therein that the same may conform to the record of the case in the Patent Office.

Signed and sealed this 3rd day of February, A. D. 1942.

(Seal)

Henry Van Arsdale,
Acting Commissioner of Patents.